United States Patent
Corrales Lopez et al.

(10) Patent No.: US 11,803,549 B2
(45) Date of Patent: Oct. 31, 2023

(54) METHOD AND SYSTEM FOR FACILITATING ON-THE-FLY OVSDB PROTOCOL TRANSLATION BETWEEN MULTIPLE OVSDB SCHEMA VERSIONS

(71) Applicant: Hewlett Packard Enterprise Development LP, Houston, TX (US)

(72) Inventors: David Corrales Lopez, Heredia (CR); Eduardo Francisco Ramirez Acosta, Heredia (CR); Sebastian Gonzalez Quesada, Heredia (CR); Daniel Gerardo Canessa Valverde, Alajuela (CR); Byron Rojas Valverde, San Jose (CR)

( * ) Notice: Subject to any disclaimer, the term of this patent is extended or adjusted under 35 U.S.C. 154(b) by 38 days.

(21) Appl. No.: 17/480,907

(22) Filed: Sep. 21, 2021

(65) Prior Publication Data

US 2023/0090170 A1    Mar. 23, 2023

(51) Int. Cl.
G06F 7/06 (2006.01)
G06F 16/2455 (2019.01)
(Continued)

(52) U.S. Cl.
CPC ........ G06F 16/24554 (2019.01); G06F 9/547 (2013.01); G06F 16/211 (2019.01);
(Continued)

(58) Field of Classification Search
CPC .. G06F 16/24554; G06F 9/547; G06F 16/211; G06F 16/2452; G06F 16/24564; G06F 16/24573; G06F 16/289
See application file for complete search history.

(56) References Cited

U.S. PATENT DOCUMENTS

| | | | |
|---|---|---|---|
| 8,954,495 B2 * | 2/2015 | Cohen | H04L 47/80 709/219 |
| 9,037,614 B1 * | 5/2015 | Parrott | G06F 8/355 707/803 |

(Continued)

OTHER PUBLICATIONS

B. Davie et al., ("The Open vSwitch Database Management Protocol (RFC7047)", Dec. 1, 2013) (Year: 2013).*

(Continued)

*Primary Examiner* — Kevin L Young
*Assistant Examiner* — Abdou K Seye

(57) ABSTRACT

A system receives a request for data stored in an OVSDB database server, wherein the request comprises a JSON RPC request. In response to the request, the system initiates a proxy session by: creating a first communication session between the requesting entity and a proxy daemon, wherein the request indicates a first version corresponding to the first communication session; and creating a second communication session between the proxy daemon and the database server, wherein the second communication session is associated with a second version corresponding to a model used by the database server. The system determines that the first version does not match the second version. The system extracts, from the request, a JSON RPC method and determines that the method requires translation. The system performs, based on the first and second version, translation of a payload of the request, and sends the translated payload to the database server.

20 Claims, 13 Drawing Sheets

(51) Int. Cl.
  *G06F 16/2457*   (2019.01)
  *G06F 9/54*   (2006.01)
  *G06F 16/28*   (2019.01)
  *G06F 16/21*   (2019.01)
  *G06F 16/2452*   (2019.01)

(52) U.S. Cl.
  CPC .... *G06F 16/2452* (2019.01); *G06F 16/24564* (2019.01); *G06F 16/24573* (2019.01); *G06F 16/289* (2019.01)

(56) References Cited

U.S. PATENT DOCUMENTS

| | | | | |
|---|---|---|---|---|
| 11,500,824 B1* | 11/2022 | Tighe | ................ | G06F 16/2452 |
| 2018/0336077 A1* | 11/2018 | Reddy | .................... | H04L 69/10 |
| 2019/0188288 A1* | 6/2019 | Holm | .................... | G06F 16/289 |

OTHER PUBLICATIONS

Young-Gook Ra ("A Transparent Schema-Evolution System Based on Object-Oriented View Technology", Jul./Aug. 1997) (Year: 1997).*

E. Andonoff et al. "A Query Algebra for Object-Oriented Databases Integrating Versions". (Year: 1997).*

* cited by examiner

| SUBEXPRESSION 402 | SYNTAX 404 | DESCRIPTION 406 | EXAMPLE 408 |
|---|---|---|---|
| Table | {"table", \<final token>} | Find the table name in a JSON key or a JSON string value. Receives one argument that indicates if the table name appears as a key or as a value | {"table", "json_key"} or {"table", "json_value"} |
| Literal | {\<literal>} | Token that will be matched as-is to construct a JSON dotted path. It should contain only one token (except "table") | {"row"} |
| Anonymous Iterable | {"for", \<min index>, \<max index>} | Iterates over an unnamed list. Typically used when the list that should be iterated is inside another list. It is composed by the token "for" and two arguments: 1) an initial list index and 2) a final list index | {"for", "0", "max"} |
| Literal Iterable | {\<literal>, \<min index>, \<max index>} | Iterates over a named list. Typically used when the list is opened by a JSON key. It is composed by any arbitrary token (except "where", "for", or "*") and two arguments: 1) an initial list index and 2) a final list index | {"rows", "0", "max"} |
| For each | {"*"} | Iterates over all the keys of the current JSON object | {"*"} |
| Where | {"where", \<min index>, \<max index>} | Iterates over a where clause. It is composed by any arbitrary token "where" and two arguments: 1) an initial list index and 2) a final list index. where has a special behavior, where if it is part of a Name primitive it finds the column name path, otherwise it behaves as Data and returns the path to the column content | {"where", "0", "max"} |
| Final | {\<final token>} | Iterates over a where clause. It is composed by any arbitrary token "where" and two arguments: 1) an initial list index and 2) a final list index. where has a special behavior, where if it is part of a Name primitive it finds the column name path, otherwise it behaves as Data and returns the path to the column content | {"json_value"} or {"json_key"} |

FIG. 4A

```
1   forEachAndMatch(expression, json, tableName, columns, dottedPath) result
2
3       subExpression = expression.first()
4
5       innerJson = GetInnerJsonWithDottedPath(json, dottedPath)
6
7       // Reached the final literal
8       if current_sub_expression.isFinal()
9
10          for each column in columns:
11              if innerJson == column:
12                  appendColumnPathsToResult(column, dottedPath)
13
14      // Table subexpression
15      else if subExpression.isTable()
16
17          if subExpression[0] == "string"
18              tablePath = subExpression[0]
19          else if subExpression[0] == "json_key"
20              tablePath = tableName
21
22          if JSONExists(json, tablePath)
23              appendTablePathToResult(result, tablePath)
24
25              // If the table name is found, continue the search for columns
26              forEachAndMatch(expression[:1], json, tableName, columns, dottedPath)
27          else:
28              // Incorrect table
29              return result
30
31      // Table literal-expression
32      else if subExpression.isLiteralIterable()
33
34          dottedPath.append("." + subExpression[0])
35
36          for each index in innerJson
37              dottedPath.append("." + index)
38
39              // Continue with the next subexpression
40              forEachAndMatch(expression[:1], innerJson, tableName, columns, dottedPath)
41
42      // Where subexpression
43      else if subExpression.isWhere()
44          // append only once
45          dottedPath.appendOnce("where")
46
47          for each index in innerJson
48              dottedPath.append("." + index)
49
50              jsonToken = GetInnerJsonWithDottedPath(innerJson, dottedPath)
51
52              // Where can have nested conditions
53              if whereJSONHasNestedConditions(innerJson, dottedPath)
54
55                  // Continue processing a where subexpression
56                  forEachAndMatch(innerJson, tableName, columns, dottedPath)
57
58              // The where clause include one of the required columns
59              else if jsonToken is in columns:
60                  // Continue with the next subexpression
61                  forEachAndMatch(expression[:1], innerJson, tableName, columns, dottedPath)
62
63      // * subexpression
64      else if subExpression.isForEach()
65          for each jsonKey in innerJson
66              dottedPath.append("." + jsonKey)
67
68              // Continue with the next subexpression
69              forEachAndMatch(expression[:1], innerJson, tableName, columns, dottedPath)
70
71      // Literal subexpression
72      else if subExpression.isLiteral()
73          dottedPath.append("." + subExpression[0])
74
75          // Continue with the next subexpression
76          forEachAndMatch(expression[:1], innerJson, tableName, columns, dottedPath)
```

FIG. 4B

```
1   {
2        "id":0,
3        "method":"transact",
4        "params": [
5              "OpenSwitch",
6              {
7                    "where": [
8                          [
9                               "name",   ~442
10                              "==",
11                              "1/1/1"
12                         ]
13                   ],
14                   "op":"select",
15                   "table":"Port",   ~444
16                   "columns": [
17                         "applied_vlan_mode",
18                         "applied_vlan_tag",
19                         "applied_vlan_trunks",
20                         "name"   ~446
21                   ]
22              }
23        ]
24   }
```

FIG. 4C

```
1   {
2        "id":0,
3        "result": [
4              {
5                   "rows": {
6
7                         "applied_vlan_mode": "trunk",
8                         "applied_vlan_tag": 1,
9                         "applied_vlan_trunks": ["set", []],
10            462~  "name": "1/1/1"
11                   }
12              }
13        ],
14        "error": null
15   }
```

FIG. 4D

METHOD AND SYSTEM FOR FACILITATING ON-THE-FLY OVSDB PROTOCOL TRANSLATION BETWEEN MULTIPLE OVSDB SCHEMA VERSIONS

BACKGROUND

Field

This disclosure is generally related to the field of data management. More specifically, this disclosure is related to a method and system for on-the-fly Open vSwitch Database (OVSDB) protocol translation between multiple OVSDB schema versions.

BRIEF DESCRIPTION OF THE FIGURES

FIG. 4A illustrates a table with OVSDB protocol primitives, in accordance with an aspect of the present application.

FIG. 4B illustrates a diagram with pseudocode associated with the OVSDB protocol matching algorithm, in accordance with an aspect of the present application.

FIG. 4C illustrates a "select" JSON RPC request, in accordance with an aspect of the present application.

FIG. 4D illustrates a "select" JSON RPC response, in accordance with an aspect of the present application.

In the figures, like reference numerals refer to the same figure elements.

DETAILED DESCRIPTION

Figure 1A:
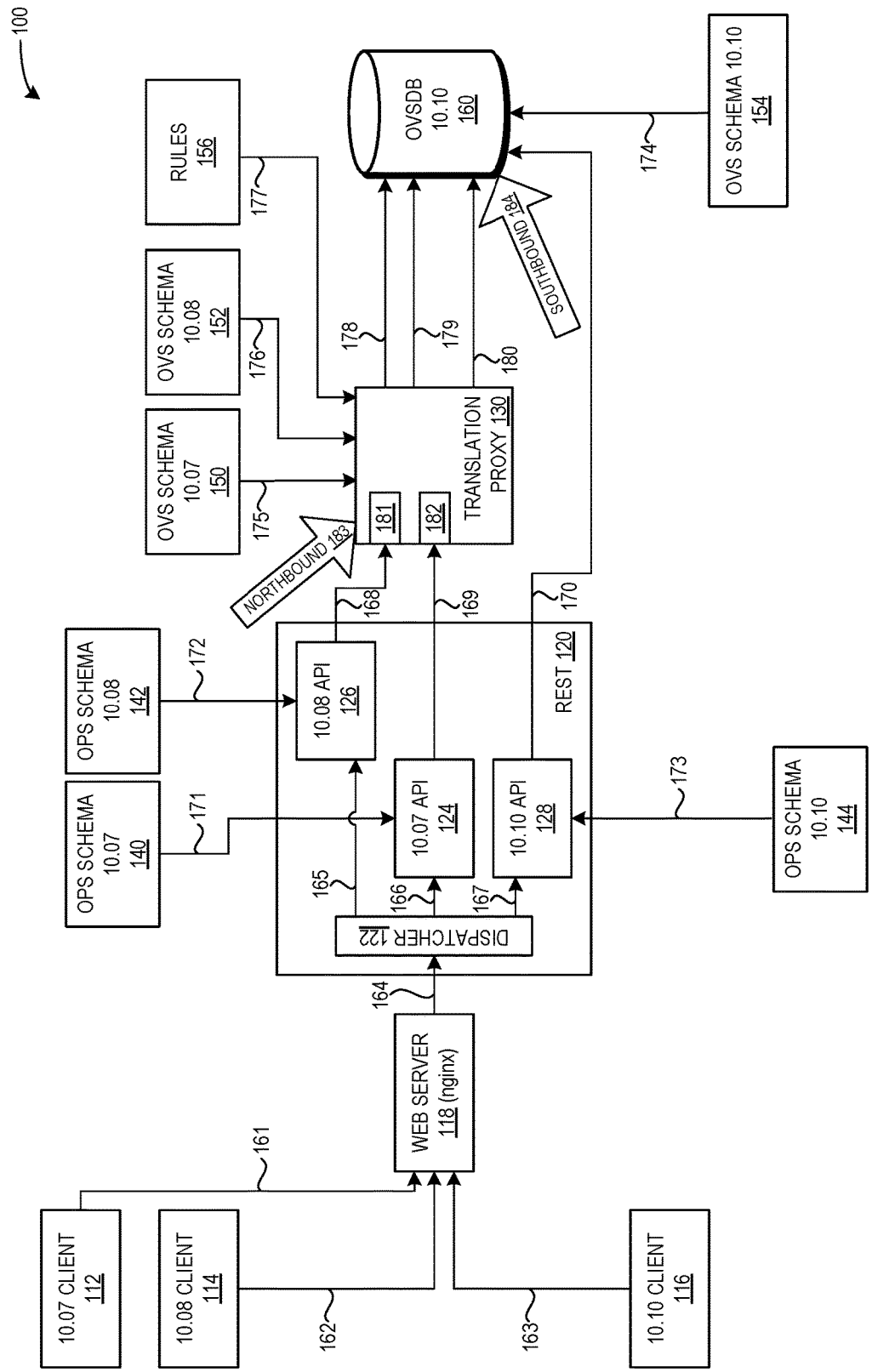
FIG. 1A illustrates a diagram with entities and communications which facilitate backwards compatibility of a representational state transfer (REST) application programming interface (API) on an evolving data model, in accordance with an aspect of the present application.

The following description is presented to enable any person skilled in the art to make and use the aspects and examples, and is provided in the context of a particular application and its requirements. Various modifications to the disclosed aspects will be readily apparent to those skilled in the art, and the general principles defined herein may be applied to other aspects and applications without departing from the spirit and scope of the present disclosure. Thus, the aspects described herein are not limited to the aspects shown, but are to be accorded the widest scope consistent with the principles and features disclosed herein.

A client may use a representational state transfer (REST) application programming interface (API) (of a certain version) to obtain or set data from/to a database (with a certain schema or model version). If an update is made to the database schema model, client calls made using a prior version of the REST API may fail. For example, an external client may use a REST API version 10.08 to successfully access or manage information stored in an Open vSwitch Database (OVSDB), which is running or uses a schema associated with version 10.08. As the database schema or model changes, the version of the schema or model changes, and so does the underlying data. An update may be made to the OVSDB, with a schema for version 10.09. The correspondingly updated REST API version 10.09 can be automatically generated from the underlying OVSDB schema data model. However, the external client may still be using a script or other automated tools based on the prior REST API version 10.08. As a result, the external client may experience failed transactions and may no longer be able to successfully access or manage information stored in the OVSDB. Similar issues may occur when a first OVSDB server using a newer model (e.g., 10.10.02) acts as a client while communicating with a second OVSDB server using an older model (e.g., 10.10.01).

The described aspects address these issues by providing a bi-directional OVSDB protocol translation proxy. This "translation proxy" be referred to as a "schema migration framework" (SMF) proxy, an SMF daemon, "smfd," or "an smfd proxy," and these terms are used interchangeably in this disclosure. The translation proxy can provide on-the-fly mangling and/or translation of OVDSB protocol messages, where the messages include JavaScript Object Notation (JSON) remote procedure call (RPC) methods (e.g., transact, get_schema, monitor, etc.) as well as certain "transact" method operations (e.g., insert, update, and delete), as defined by the OVSDB protocol.

The translation proxy allows a client with a different schema version than the version present and running on the OVSDB server to successfully communicate with the OVSDB server.

REST Backwards Compatibility and In-Service Software Upgrade

The translation proxy can be used to facilitate both backwards compatibility of a REST API and an in-service software upgrade. Aspects of the translation proxy can provide a JSON RPC server interface to which clients may connect (also referred to as a "northbound" connection).

Once the northbound connection is created, the system can create a matching or corresponding "southbound" connection to an OVSDB server. This handshake or creation of this one-to-one pairing (including extra data) of a northbound connection and a southbound connection can be referred to as a "proxy session." Because data exchange is bi-directional, the terms "origin" and "target" may be used to differentiate between a north-to-south scenario and a south-to-north scenario, as described below in relation to FIG. 2. Furthermore, the system can determine a version corresponding to the northbound version (northbound communication session) by examining the contents of a slightly extended "get_schema" JSON RPC request. Because OVSDB clients may send this request upon session establishment, the northbound version is available and known early in the creation of a proxy session. Northbound and southbound sessions are described below in relation to FIGS. 1A, 1B, and 2.

FIG. 1A illustrates a diagram 100 with entities and communications which facilitate backwards compatibility of a REST API on an evolving data model, in accordance with an aspect of the present application. In diagram 100, a client using an older data model (v10.07) can communicate with an OVSDB server using a newer data model (v10.10). In diagram 100, multiple clients can transmit Hypertext Transfer Protocol (HTTP) requests, e.g., by using Uniform Resource Identifiers (URIs) with different REST API versions to indicate which REST API version they wish to use. A web server can receive and dispatch these HTTP requests to the appropriate REST API module, which in turn can send the request either directly to the OVSDB server (in the case where the REST API version matches the current database schema version) or to a translation proxy (in the case where the REST API version does not match or is prior version of the current database schema version). The system can load the various OVSDB schema definitions (e.g., the Open Switch or OPS schemas) into the appropriate REST API module. In addition, the system can prune the OPS schemas to obtain Open vSwitch (OVS) schemas. The system can load the prior OVS schemas and a set of rules into the translation proxy, and can further load the current OVS schema into the database server itself.

For example, in diagram 100, the system can load an OVS schema 10.10 154 (a current version) into an OVSDB 10.10 server 160 (via a communication 174) and initialize the data model with the loaded OVS schema 10.10 154. The system can load an OPS schema 10.07 140 and an OPS schema 10.08 142 into, respectively, a REST 10.07 API module 124 and a REST 10.08 API module 126 (via, respectively, communications 171 and 172). The system can also load an OPS schema 10.10 144 (the current version) into a REST 10.10 API module 128 (via a communication 173). The system can initialize the REST APIs for each loaded schema, and connect to a translation proxy 130 and OVSDB 10.10 server 160.

Furthermore, the system can also load an OVS schema 10.07 150 and an OVS schema 10.08 152 (prior versions) into translation proxy 130 (via communications 175 and 176, respectively), and can cache the loaded schemas. The system can also load rules 156 into translation proxy 130 (via a communication 177). Rules 156 can include rules and logic for how to convert or transform (e.g., rename, move, delete, etc.) tables and columns from different OVSDB schema versions). Translation proxy 130 may be referred to as a schema migration framework (SMF) translation proxy, an SMF proxy, or an SMF daemon ("smfd"), and rules 156 may be referred to as SMF rules.

A REST API 10.07 client 112 can send a URI indicating a prior version 10.07 (via a communication 161), and a REST API 10.08 client 114 can send a URI indicating a prior version 10.08 (via a communication 162). Another REST API 10.10 client 116 can send a URI indicating a current version 10.10 (via a communication 163). These URIs and requests can be received by a web server 118 (e.g., nginx), which can send the request on to a dispatcher or dispatch component 122 of a REST module 120 (via a communication 164). Dispatcher 122 can dispatch each request to the appropriate REST API module, based on the versions used or indicated in the received URIs or requests. For example: dispatcher 122 can send the request from REST API 10.07 client 112 to a REST 10.07 API module 124 (via a communication 166); dispatcher 122 can send the request from REST API 10.08 client 114 to a REST 10.08 API module 126 (via a communication 165); and dispatcher 122 can send the request from REST API 10.10 client 116 to a REST 10.10 API module 128 (via a communication 167).

In the latest or most recent version of the REST API module (e.g., REST 10.10 API module 128), the system can determine that the REST API version matches the current database schema, and send the request directly to OVSDB 10.10 server 160 (via a communication 170) to obtain the requested results.

In the prior versions of the REST API modules (e.g., REST 10.07 API module 124 and REST 10.08 API module 126), the system can determine that the REST API version does not match (i.e., "nonmatching") or is a prior version of the current database schema, and send the request to translation proxy 130 (via, respectively, communications 168 and 169). Each client can establish a communication session with translation proxy. For example, client 112, via REST 10.07 API 124, can create a first communication session (via a communication 169) between the requesting entity (124) and translation proxy 130, wherein the request indicates the version 10.07 corresponding to the first communication session. This first communication session may be referred to as a "northbound connection" (e.g., as indicated by a northbound session 183), and may be made to a socket 181 of translation proxy 130. Similarly, client 114, via REST 10.08 API 126, can create another first communication session (via a communication 168) between the requesting entity (126) and translation proxy 130, wherein the request indicates the version 10.08 corresponding to the other first communication session. This other first communication session may also be referred to as a "northbound connection" (e.g., as indicated by northbound session 183), and may be made to a socket 182 of translation proxy 130.

The system may create these first communication sessions (i.e., the northbound 183 connections) upon initialization of a proxy session. The system can also create a corresponding second communication session or "southbound connection" (e.g., as indicated by a southbound session 184) between the translation proxy 130 and OVSDB 10.10 server 160. A detailed description of the creation of a proxy session, including a northbound and southbound connection, as well as a direction of north-to-south and south-to north translations, is provided below in relation to FIG. 2.

Furthermore, each REST API module may utilize multiple separate channels to translation proxy 130. That is, each of communications 168, 169, and 170 may include multiple channels (not shown). One channel can be for monitors, e.g., a process to be subscribed to the database and automatically receive information if certain changes to the database occur (similar to a communication 594 described below in relation to FIG. 5). Another channel can be for polling the database, e.g., querying the database for information regarding a certain table/column/row.

Translation proxy 130 can perform on-the-fly OVSDB protocol translations for multiple OVSDB schemas versions against the current version. Translation proxy 130 can perform these translations by applying one or more of rules 156 (which were previously loaded into translation proxy 130 via communication 177), to obtain converted requests. These translations (of requests from clients to the database server) may be referred to as "north-to-south translations." Translation proxy 130 can send these converted requests to OVSDB 10.10 server 160 (via, respectively, communications 178 and 179) to obtain the requested results. Translation proxy 130 can apply reverse translations as needed, to obtain results in a format to return to the requesting clients. These reverse translations (of data from the database server to be returned to the clients) may be referred to as "south-to-north translations." The system can send the obtained results (either the requested results obtained directly from OVSDB 10.10 160 (via a communication 170) or the reverse translated results obtained by translation proxy 130 (via the north-to-south translations, communications 178 and 179, and the south-to-north translations) to web server 118, which can send the results back to the appropriate requesting client (e.g., 112, 114, or 116). In addition, translation proxy 130 can obtain or retrieve data from OVSDB 10.10 server 160, including information needed by translation proxy 130 to translate or convert a request (via a communication 180). This communication may be referred to as a "sideband cache" and is described below in relation to communication 580 of FIG. 5.

Figure 1B:
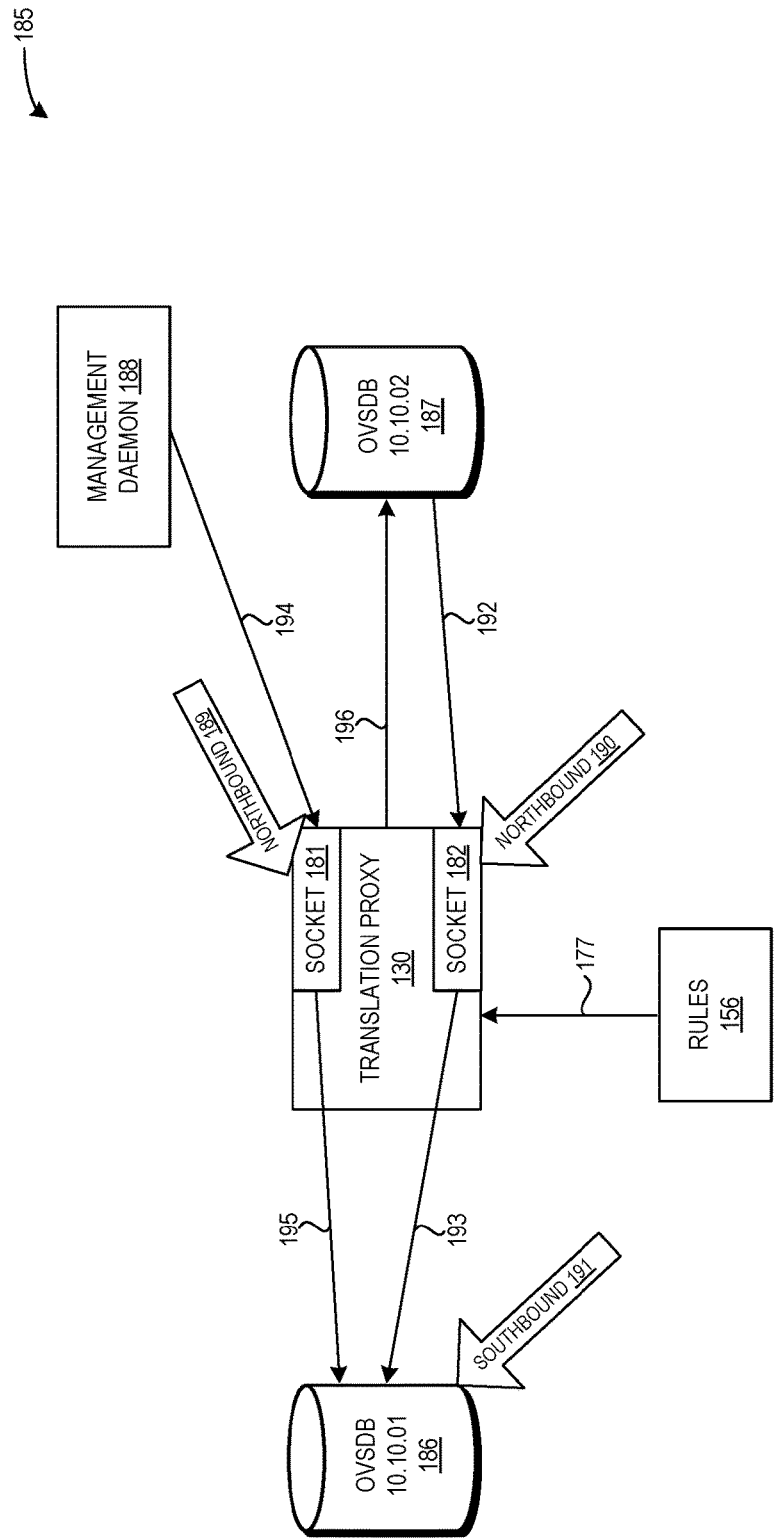
FIG. 1B illustrates a diagram with entities and communications which facilitate an in-service software upgrade, in accordance with an aspect of the present application.

FIG. 1B illustrates a diagram 185 with entities and communications which facilitate an in-service software upgrade, in accordance with an aspect of the present application. In diagram, an OVSDB 10.10.02 server 187 (which is running a newer version 10.10.02 of the schema model) can communicate with an OVSDB 10.10.01 server 186 (which is running an older version 10.10.01 of a schema model). The system can establish a proxy session by creating a first northbound communication session 190 (between OSVDB 10.10.02 server 187 and translation proxy 130) and a second southbound communication session 191 (between translation proxy 130 and OVSDB 10.10.01 server 186).

OVSDB 10.10.02 server 187 can send a request (via a communication 192), which can be dispatched to and received by translation proxy 130 (as described above in relation to FIG. 1). Translation proxy can perform the necessary translations (using rules 156 loaded via communication 177 and further using data as described above in relation to FIG. 1), and can send the translated request to OVSDB 10.10.01 server 186 (via a communication 193). OVSDB 10.10.01 server 186 can send a response back in reverse to translation proxy 130, which can perform any necessary reverse translations (via a reverse of communications 193 and 192).

In another aspect, management daemon 188 can initiate or establish a proxy session, which creates a first northbound communication session 189 (between management daemon 188 and translation proxy 130) and a second southbound communication session 191 (as similarly indicated by the general "southbound 191 connection") (between translation proxy 130 and OVSDB 10.10.01 server 186). Management daemon 188 can send and receive information in a similar manner as described above for OVSDB 10.10.02 server 187 (i.e., via a communication 194, socket 181 of translation proxy 130, and communication 195, including in a reverse direction).

Figure 2:
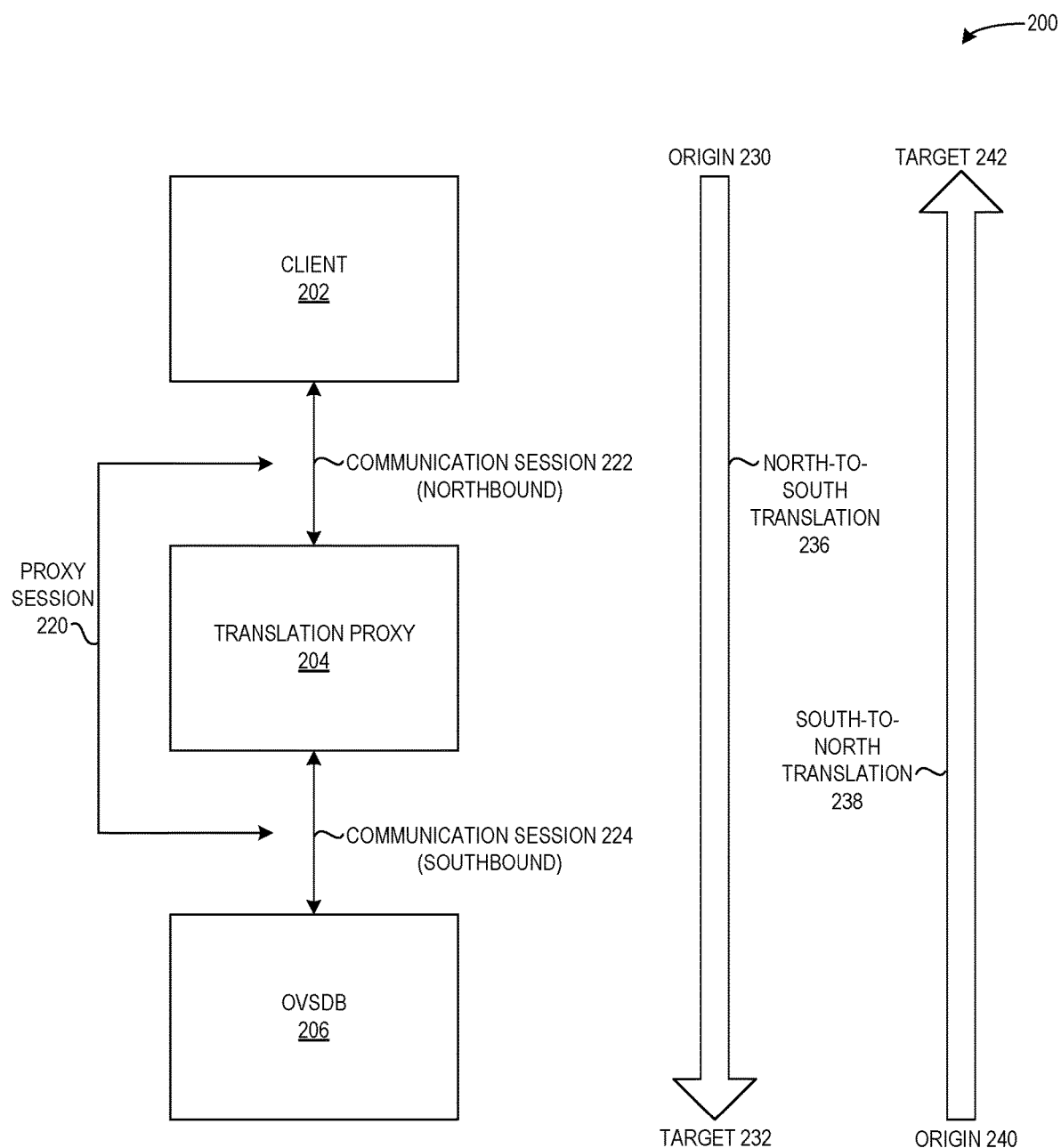
FIG. 2 illustrates a diagram of entities communicating to create a proxy session, including directions of communication, in accordance with an embodiment of the prior art.

Creating a Proxy Session; and Northbound/Southbound Communication Sessions and Translations As described above, the system can create a proxy session when establishing a session. This proxy session include a one-to-one pairing of a first communication session ("northbound connection" between a client and a translation proxy) and a second communication session (a "southbound connection" between a translation proxy and an OVSDB server). FIG. 2 illustrates a diagram 200 of entities communicating to create a proxy session, including directions of communication, in accordance with an embodiment of the prior art. Diagram 200 can include entities such as a client 202, a translation proxy 204, and an OVSDB server 206. During communications to establish a proxy session, the system can create a first communication session 222 (northbound connection) between client 202 and translation proxy 204, and can also create a second communication session 224 (southbound connection) between translation proxy 204 and OVSDB server 206. Thus, the system can create a proxy session 220 which includes the pair of northbound (222) and southbound (224) communication sessions.

In addition, when data, packets, information, or requests are traveling from an "origin" to a "target," the type of translation depends on the direction of the travel and the involved entities. For example, when client 202 (acting as an origin 230) sends a request for data to OVSDB server 206 (acting as a target 232), this communication can undergo a north-to-south translation 236. In contrast, on the return trip, when OVSDB server 206 (acting as an origin 240) sends a response to client 202 (acting as a target 242), this communication can undergo a south-to-north translation 238.

Figure 3A:
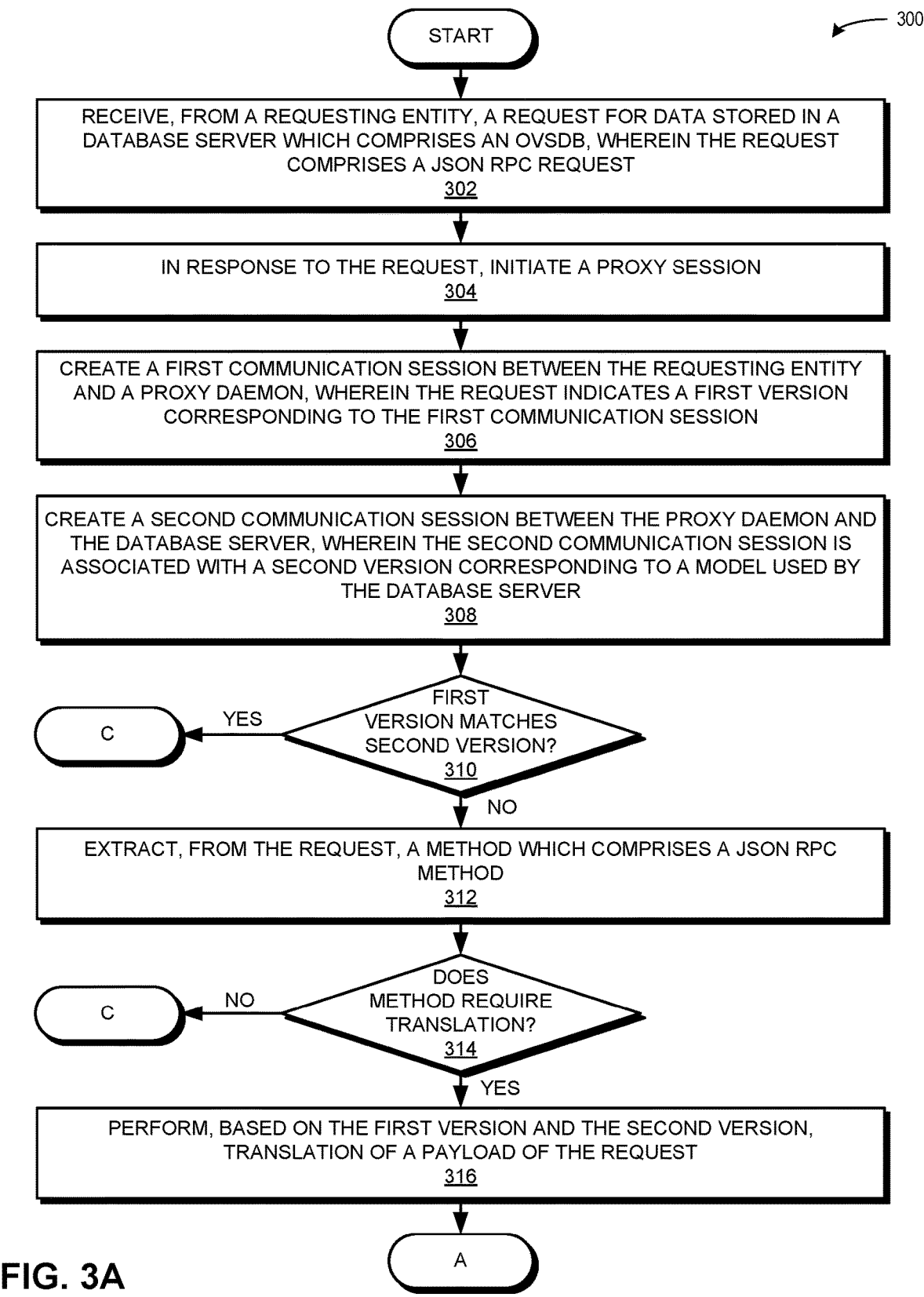
FIG. 3A presents a flowchart illustrating a method which facilitates on-the-fly OVSDB protocol translation between multiple OVSDB schema versions, in accordance with an aspect of the present application.

Method Which Facilitates On-the-Fly OVSDB Protocol Translation Between Multiple OVSDB Schema Versions FIG. 3A presents a flowchart 300 illustrating a method which facilitates on-the-fly OVSDB protocol translation between multiple OVSDB schema versions, in accordance with an aspect of the present application. During operation, the system receives, from a requesting entity, a request for data stored in a database server which comprises an Open vSwitch Database (OVSDB), wherein the request comprises a JavaScript Object Notation (JSON) remote procedure call (RPC) request (operation 302). In response to the request, the system initiates a proxy session (operation 304), by the following two operations: the system creates a first communication session between the requesting entity and a proxy daemon, wherein the request indicates a first version corresponding to the first communication session (operation 306); and the system creates a second communication session between the proxy daemon and the database server, wherein the second communication session is associated with a second version corresponding to a model used by the database server (operation 308).

Figure 3B:
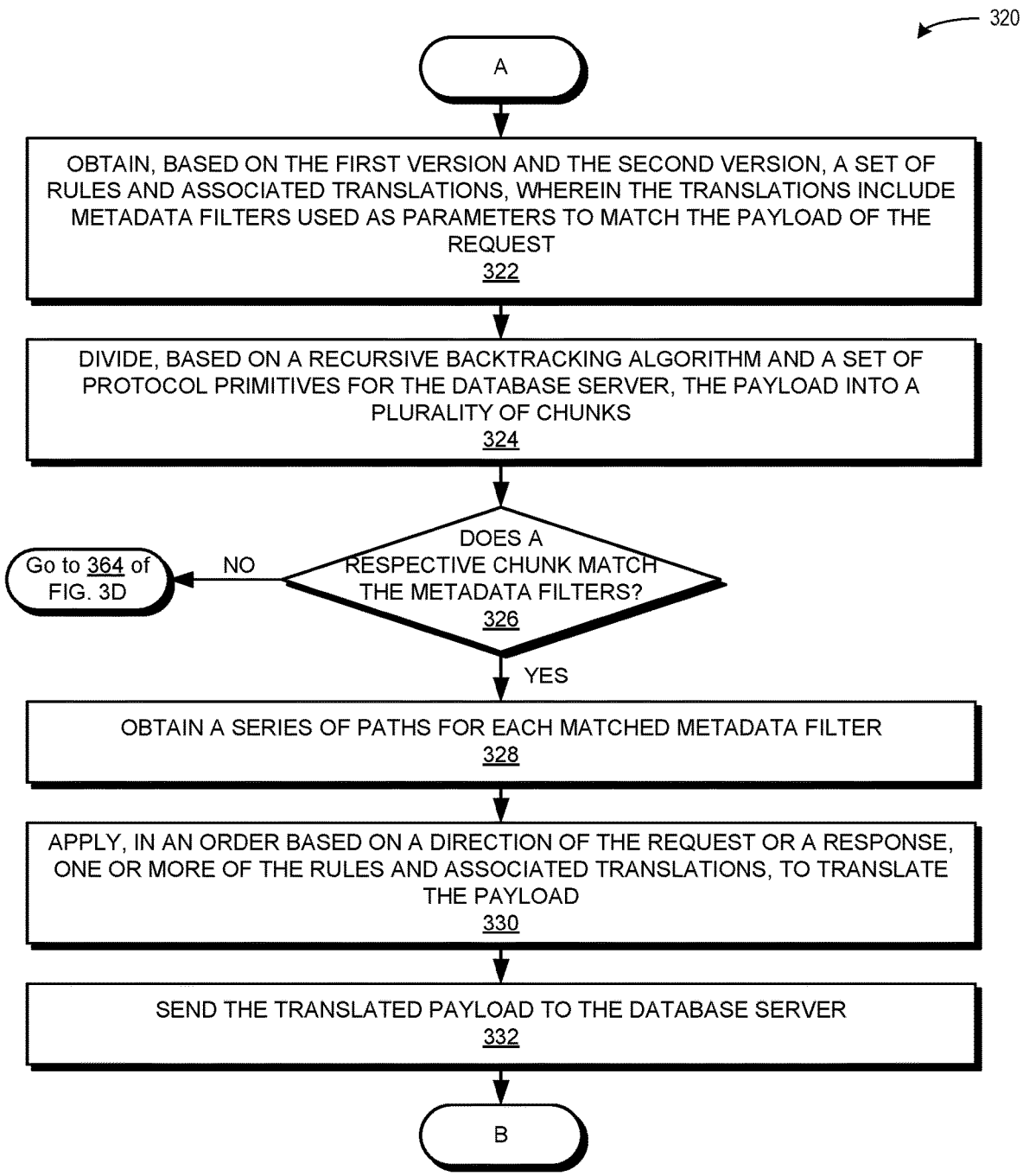
FIG. 3B presents a flowchart illustrating a method which facilitates on-the-fly OVSDB protocol translation between multiple OVSDB schema versions, in accordance with an aspect of the present application.
Figure 3C:
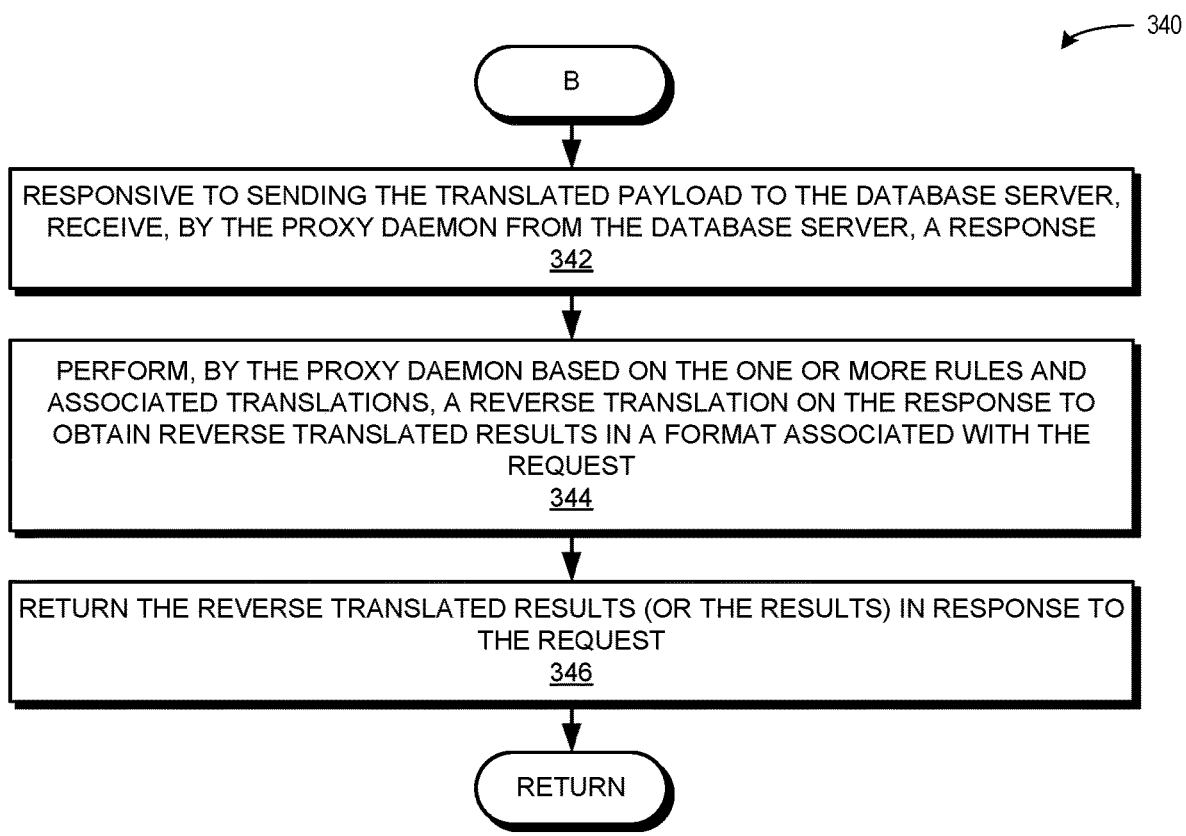
FIG. 3C presents a flowchart illustrating a method which facilitates on-the-fly OVSDB protocol translation between multiple OVSDB schema versions, in accordance with an aspect of the present application.
Figure 3D:
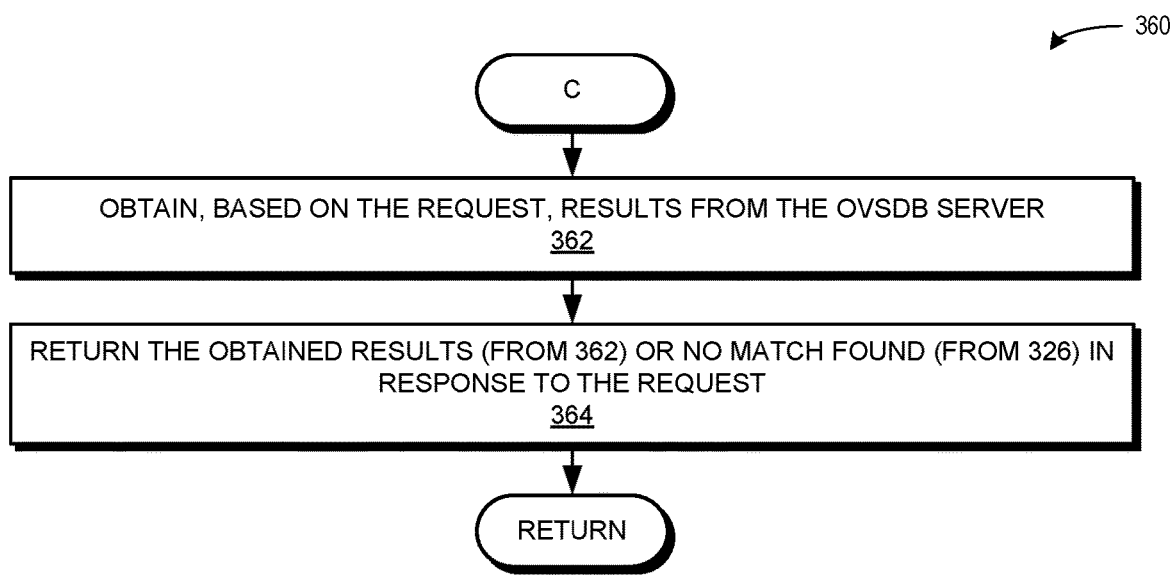
FIG. 3D presents a flowchart illustrating a method which facilitates on-the-fly OVSDB protocol translation between multiple OVSDB schema versions, in accordance with an aspect of the present application.

Responsive to determining that the first version does match the second version (decision 310), the operation continues at Label C of FIG. 3D. The system can compare the first version and the second version (which can be expressed as "origin=target"). Responsive to determining that the first version does not match the second version (decision 310), the system extracts, from the request, a method which comprises a JSON RPC method (operation 312). Examples of a JSON RPC method can include "transact," "update," and "monitor." If the extracted JSON RPC method is "transact," the system can further extract one or more operations corresponding to the method (e.g., "insert,"

"update," "delete," and "wait"). This extraction can be performed by an existing JSON RPC library (e.g., a JSON RPC2 library 522 as depicted below in relation to FIG. 5).

The system checks the extracted method to determine whether translations are supported. In some aspects, some methods may be supported for translation while others may not, and in other aspects, all methods may be supported for translation. Responsive to determining that the method does not require or does not support translation (decision 314), the operation continues at Label C of FIG. 3D. Responsive to determining that the method requires translation (decision 314), the system performs, based on the first version and the second version, translation of a payload of the request (operation 316). The operation continues at Label A of FIG. 3B.

FIG. 3B presents a flowchart 320 illustrating a method which facilitates on-the-fly OVSDB protocol translation between multiple OVSDB schema versions, in accordance with an aspect of the present application. Flowchart 340 includes operations related to a north-to-south translation. The system obtains, based on the first version and the second version, a set of rules and associated translations, wherein the translations include metadata filters used as parameters to match the payload of the request (operation 322). These rules may be obtained based on data previously loaded into the translation proxy (e.g., rules 156 loaded into translation proxy 130 via communication 177 of FIGS. 1A and 1B), and the associated translations contain metadata filters. The system can use the metadata filters as parameters when matching the payload of the JSON RPC message. Examples of possible metadata filters can include: a table only, which matches any JSON containing operations on the table; and a table and one or more columns, which matches a JSON containing operations on the table and at least one column (i.e., based on performing OR operation during evaluation of the at least one column).

The system divides, based on a recursive backtracking algorithm and a set of protocol primitives for the database server, the payload into a plurality of chunks (operation 324). Protocol primitives are described below in relation to FIG. 4. Responsive to determining that a respective chunk does not match the metadata filters (decision 326), the operation continues at operation 364 of FIG. 3D (in which the system returns a "no match found" in response to the request).

Responsive to determining that a respective chunk matches the metadata filters (decision 326), the system obtains a series of paths for each matched metadata filter (operation 328). JSON paths can be represented in dotted-notation, and can be used to unequivocally describe the location of a given JSON object/value within a JSON document. Furthermore, each JSON path can specify the JSON object which should be modified or deleted during translation.

The system applies, in an order based on a direction of the request or a response, one or more of the rules and associated translations, to translate the payload (operation 330). In applying the one or more rules and associated translations, the system can determine that additional data is required from the database server, obtain the additional data from the database server, and use the additional data to translate the payload. If at least one metadata filter match occurs after the JSON paths are fully determined or calculated, the system can apply the individual rules (and their translations) to the JSON payload. After performing each translation (or calling a special API, such as for deleting a column), the system may need to recalculate the JSON paths, as the JSON paths may become invalid due to changes in the JSON payload. Once the JSON payload is fully translated, the system sends the translated payload to its target. In the case of north-to-south messages, the system sends the translated payload to the database server (operation 332), and a response is expected from the database server. This response from the database server can follow the same path but the system can apply the rules and translations in reverse order (as described below in relation to FIG. 3C).

FIG. 3C presents a flowchart 340 illustrating a method which facilitates on-the-fly OVSDB protocol translation between multiple OVSDB schema versions, in accordance with an aspect of the present application. Flowchart 340 includes operations related to a south-to-north translation. Responsive to sending the translated payload to the database server, the system receives, by the proxy daemon from the database server, a response (operation 342). The system performs, by the proxy daemon based on the one or more rules and associated translations, a reverse translation on the response to obtain reverse translated results in a format associated with the request (operation 344). The system returns the reverse translated results (or results) in response to the request (operation 346), and the operation returns.

In general, "south-to-north messages" (which are not in response to a request received via a north-to-south translation) are typically unidirectional e.g., from the server to a client, with a notification of a change, such as a change in a column value. The OVSDB server can provide an asynchronous functionality (which is supported by the translation proxy), in which a client (such as a REST client) can subscribe to and/or monitor certain tables and/or columns. If a change occurs in the subscribed-to tables/columns, the OVSDB server can send a change notification as a JSON RPC request. This asynchronous call does not have the roundtrip nature of a normal or standard JSON RPC request, as it only requires a south-to-north translation (as described below in relation to notification 594 of FIG. 5).

FIG. 3D presents a flowchart 360 illustrating a method which facilitates on-the-fly OVSDB protocol translation between multiple OVSDB schema versions, in accordance with an aspect of the present application. The system obtains, based on the request, results from the OVSDB server (operation 362). The system returns the obtained results (if the information flow comes from operation 362 of FIG. 3D) or a "no match found" (if the information flow comes from operation 326 of FIG. 3B) in response to the request (operation 364).

If the OVSDB determines an error in response to a request (whether received via the translation proxy or directly from a REST API module or client), the OVSDB can generate an error message (such as the "no match found" message described herein). The translation proxy can pass the error message back to the requesting entity or client. The system can log proxy-specific errors, and can also return these proxy-specific errors in a format that is as similar as possible to other OVSDB server error messages (e.g., in format and content).

Rule Loader

The system can include a rule loader component or mechanism, as described below in relation to rules API 550 of FIG. 5. The rule loader can use both the northbound and the southbound versions to determine a subset of rules which can be used to translate a request from a first version to a second version (e.g., from one version to another, from a prior version to a current version, or from a current version to a prior version). In set notation, the determined subset of rules to be applied is bound by "]origin, target]." Thus, the rules are determined as "from but not including the origin up to and including the target." This allows the system to ignore the most recent rule used to arrive at a certain state or search state, but does include all rules used to arrive at the target. That is, all rules created after the origin up to the target (inclusive) need to be applied in order for an older version to be compatible with a newer data model on the north-to-south translations. In the south-to-north translation, the subset of applied rules remains the same but can be applied backwards or in a reverse order. The order of applying each rule (in a certain direction in the north-to-south translation and in a certain reverse direction in the south-to-north translation) needs to be preserved, as a respective rule may be dependent on a prior rule.

OVSDB Protocol Primitives and JSON RPC Matching Backtracking Algorithm

The described aspects can provide a set of OVSDB protocol primitives, which can be a set of token-based expressions used to describe the OVSDB protocol syntax. The system can use these protocol primitives to dissect and match incoming JSON RPC requests, with a granularity at the JSON object level (e.g., down to the column level). These protocol primitives may include generic and reusable subexpressions, which can be likened to "lexemes." By using these protocol primitives, the system can support new OVSDB protocol methods in the future without having to rewrite the entire parsing logic. The subexpressions can be derived from the protocol RFC 7047 and other specific OVSDB implementation methods.

FIG. 4A illustrates a table 400 with OVSDB protocol primitives, in accordance with an aspect of the present application. Table 400 includes, for subexpressions, rows or entries which indicate columns, including: a respective subexpression 402; a syntax 404 for the respective subexpression; a description 406 for the respective subexpression; and an example 408 of the respective subexpression.

The JSON RPC matching algorithm can use backtracking to search inside a JSON object (which may be viewed as a tree) in a recursive manner. The algorithm can test OVSDB primitives, one subexpression at a time. FIG. 4B illustrates a diagram 410 with pseudocode associated with the OVSDB protocol matching algorithm, in accordance with an aspect of the present application. Diagram 410 can include pseudocode lines 1-76, which can include pseudocode corresponding to the subexpressions depicted in FIG. 4A. For example: lines 7-12 correspond to the subexpression "Final" (i.e., reaching the final literal); lines 14-29 correspond to the subexpression "Table"; lines 31-40 correspond to the subexpression "Literal iterable"; lines 42-61 correspond to the subexpression "Where"; lines 63-69 correspond to the subexpression "For Each"; and lines 71-76 correspond to the subexpression "Literal."

The system can divide a primitive expression into two categories. A first category is a "name" category, which can represent a JSON object containing an OVSDB column name. A second category is a "data" category, which can represent a JSON object containing an OVSDB column value. A single JSON RPC request may contain one or more of these instances (i.e., name and/or data). The system can define each OVSDB method and operation. A final set of matches can provide the translation proxy with data to decide whether a rule should be applied and, when applying the rule, where exactly to mutate or modify the JSON object.

The example below depicts the algorithm performing a search for a column named "name" within a table named "Port" as part of a "select" request (relating to FIG. 4C) to obtain results, and results from a corresponding "select" response (relating to FIG. 4D). In a "select" operation, the system can use the following primitive expressions:

```
rpc.TRANSACT_SELECT:
  Name: primitives{
    #1 {{"table", "json_value"}, {"where", "0", "max"}, {"json_key"}}
    #2 {{"table", "json_value"}, {"columns", "0", "max"},
       {"json_value"}}
  }
  Data: primitives{
    #1 {{"table", "json_value"}, {"where", "0", "max"}, {"json_value"}}
    #2 {{"table", "json_value"}, {"rows", {"for", "o", "max"},
       {"json_key"}}
  }
}
```

FIG. 4C illustrates a "select" JSON RPC request 440, in accordance with an aspect of the present application. Request 440 can indicate a search for a column named "name" (as indicated by 442 and 446) within a table named "Port" (as indicated by 444). Upon receiving and processing JSON RPC request 440, the algorithm can produce the following search results:

Name primitives
   #1 {{"table", "json_value"}, {"where", "0", "max"}, {"json_key"}}
   Matches:
     Column "name"→"where.0.0"
     Table "Port"→"table"
   #2 {{"table", "json_value"}, {"columns", "0", "max"}, {"json_value"}}
   Matches:
     Column "name"→"columns.3"
     Table "Port"→"table"
Data primitives
   #1 {{"table", "json_value"}, {"where", "0", "max"}, {"json_value"}}
   Matches:
     Column "name"→"where.0.2"
     Table "Port"→"table"
   #2 {{"rows", {"for", "0", "max"}, {"json_key"}}
   Matches:
     None FIG. 4D illustrates a "select" JSON RPC response 460, in accordance with an aspect of the present application, including the searched-for column named "name" (as indicated by 462) and its result of "1/1/1". Upon receiving and processing JSON RPC response 460, the algorithm can produce the following results:

Name primitives
   #1 {{"table", "json_value"}, {"where", "0", "max"}, {"json_key"}}
   Matches:
     None (the table name is not explicit, but rather implicit and kept in track internally)
   #2 {{"table", "json_value"}, {"columns", "0", "max"}, {"json_value"}}
   Matches:
     None
Data primitives
   #1 {{"table", "json_value"}, {"where", "0", "max"}, {"json_value"}}
   Matches:
     None
   #2 {{"rows", {"for", "0", "max"}, {"json_key"}}
   Matches:
     Column "name"→"row.0.name"
     Table "Port"→" "

Thus, the above examples relating to FIGS. 4C and 4D depict how aspects of the described system use the OVSDB protocol primitives as name primitives and data primitives in one specific operation or method of a "transact" method. Other name primitives and data primitives may be used for other methods and other "transact" operations. The output or result of the search performed by the algorithm is a set of JSON paths for each column and for the table name. Different rules may apply for different names (tables, columns, etc.). The system can also provide the information to be used in the event that an element in the JSON object may need to be deleted, e.g., which may impact an element indicated by the JSON dotted notation path.

Translation of OVSDB Protocol Messages

In translating OVSDB protocol messages based on different data models (i.e., a connecting client uses a version X while the server uses an older/newer/different version Y), three possible scenarios exist for the type and results of the translation. In a first scenario, lossless translation may occur, in which all data can be bi-directionally translated between different versions. An example of lossless translation is renaming a data column.

In a second scenario, lossy translation may occur, in which a portion of data is lost in either one direction or both when performing the translation. An example of lossy translation is collapsing an enumeration or list from n to m values, where n<m. As an example, for a given element, if version X has enumeration values of [a,b,c] and version Y has enumeration values of [d,e], the system may assume the following mapping: i) a→d; ii) b→d; and iii) c→e. However, it would be impossible to know when translating Y to X, and given 'd,' whether 'd' corresponds to 'a' or corresponds to 'b.' In this second scenario, the system (e.g., via Rules API 550 depicted in FIG. 5) can create a log, indicating information such as: which entity asked for what data; which version may have been expecting a first element, but instead was provided with a second different element; and any other information associated with the lossy translation.

In a third scenario, irreconcilable translation may occur, in which a translation cannot be expressed due to data being removed from a data model. An example of a condition which may result in irreconcilable translation is deletion of an entire table. In such a case, the system may pass a message to the server, which notifies the user that the data no longer exists or does not exist.

Detailed View of Translation Proxy

Figure 5:
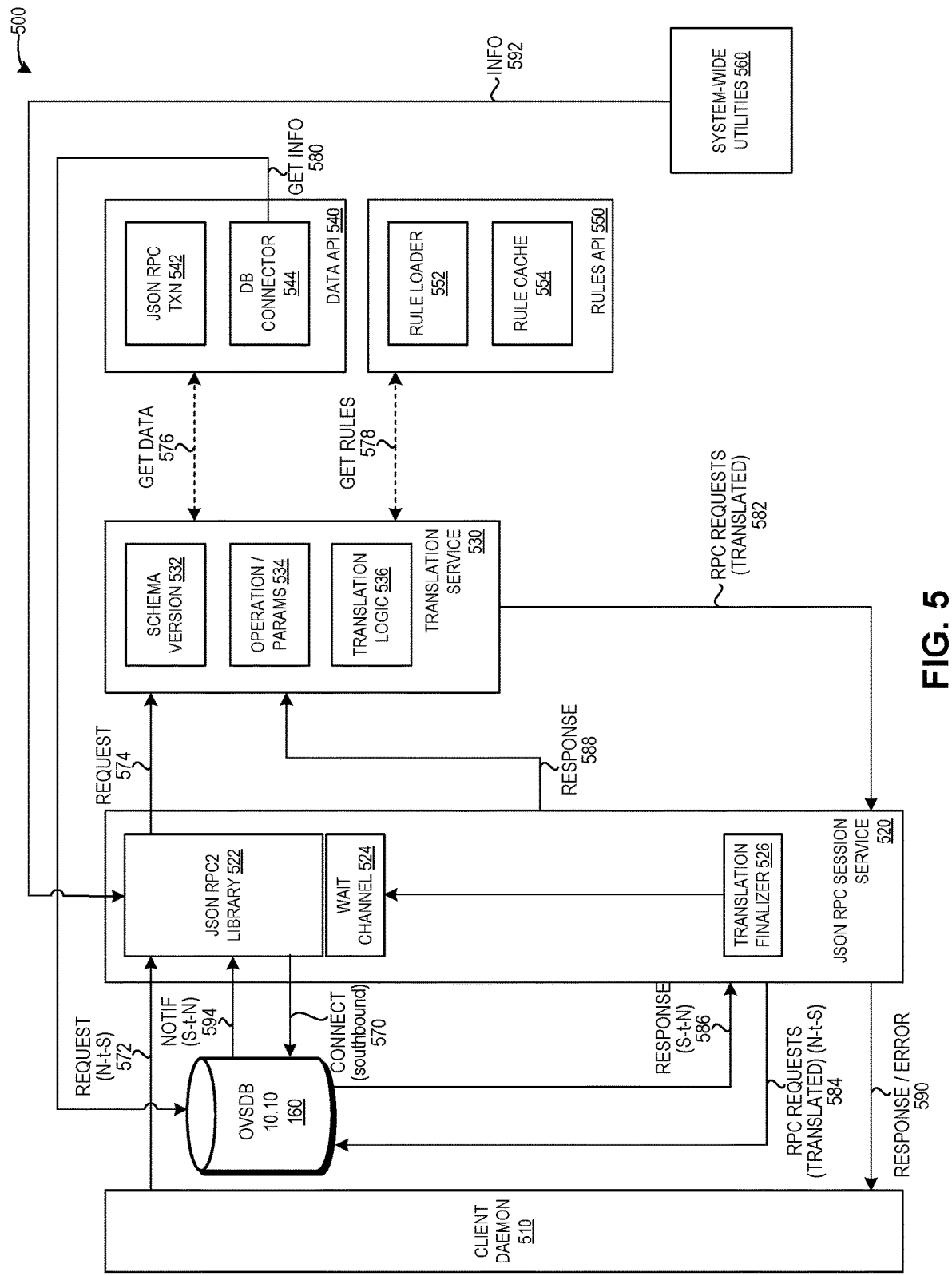
FIG. 5 illustrates a diagram which depicts a detailed view of a translation proxy, in accordance with an aspect of the present application.

FIG. 5 illustrates a diagram 500 which depicts a detailed view of a translation proxy, in accordance with an aspect of the present application. Diagram 500 depicts communications and stages/services between a client daemon 510, an OVSDB 10.10 server 160, a JavaScript Object Notation (JSON) remote procedure call (RPC) session service 520, a translation service or component 530, a data API 540, a rules API 550, and a system-wide utilities module 560. The stages/services depicted in diagram 500 can operate concurrently to service multiple concurrent OVSDB JSON RPC requests. The translation proxy or daemon can perform initialization procedures for booting up, including connecting to OVSDB server 160 in a southbound direction (via a connect (southbound) 570 communication) and opening a socket (in a northbound direction) waiting for OVSDB clients.

An external REST client (510) can establish a session which is accepted as a northbound connection by the translation proxy, and can also send a JSON RPC request (north-to-south) 572 to JSON RPC session service 520. JSON RPC session service 520 can include a JSON RPC2 library 522, a wait channel 524, and a translation finalizer 526. JSON RPC2 library 522 can include functionality to accept connections, manage sessions, and handle RPC callbacks and calls.

JSON RPC session service 520 can send a JSON RPC request 574 to translation service 530. The north-to-south translation can begin. Translation service 530 can include a schema version module 532, an operations/parameters module 534, and a translation logic module 534. Translation service 530 can selectively unmarshall the JSON RPC request, which can be supported by schema version 532 and clients. Translation service 530, via its components, can also parse the JSON RPC request, e.g., to extract a method. Translation service 530 can obtain data (via a get data 576 communication) from data API 540 to match the requests by table(s) or column(s). Data API 540 can include a JSON RPC transaction module 542 and a database (DB) connector 544 (e.g., an interface description language (IDL)). JSON RPC transaction module 542 can include data contained in the JSON RPC request, and DB connector 544 can include data used for translations (which data can be retrieved as needed from OVSDB server 160 (via a get information 580 communication)). Translation service 530 can also obtain rules (via a communication get rules 578) from rules API 550. Rules API 550 can include a rule loader component 552 and a rule cache 554.

Translation service 530, via its components, can translate the JSON RPC request using information from the request itself (e.g., associated with JSON RPC transaction module 542) or information from the local OVSDB server 160 (e.g., as obtained by DB connector 544 via communication 580). Translation service 530 can send the translated request to JSON RPC session service 520 (via an RPC requests (translated) 582 communication). JSON RPC session service 520 can send the translated request to OVSDB server 160 (via an RPC requests (translated) 584 communication, which is indicated as a north-to-south communication). OVSDB server 160 can respond to the JSON RPC request and return a response 586 (which is indicated as a south-to-north communication).

At this point, the south-to-north translation can begin, which translation is a similar process as described above in relation to communications 576 (and associated operations relating to data API 540), 578 (and associated operations relating to rules API 550), 580, and 582, but in a reverse direction. The result of the south-to-north translation can be sent as a final result back to the REST client (510) (via a communication response/error 590).

System-wide utilities 560 can include, e.g., modules which perform functions relating to registering errors, correlating information, controlling operating systems, and logging diagnostics. System-wide utilities 560 can send information 592 to OVSDB server 160, which information can be used for maintenance, logging, error-reporting, or other purposes. For example, if OVSDB server 160 receives translated request 584 and cannot return data successfully in response 586, OVSDB can send an error message back in response 586. The error message may include information obtained from information 592 (which was obtained by system-wide utilities 560). This is depicted as final communication response/error 590 back to the REST client (510).

In addition, OVSDB server 160 can provide an asynchronous functionality, supported by the translation proxy, in which a REST client (such as 510) may subscribe to and/or monitor particular tables and/or columns of data stored in OVSDB server 160. OVSDB server 160 can send a change notification 594 (which is indicated as a JSON RPC request in a south-to-north direction). Change notification 594 does not have the same roundtrip nature of a normal JSON RPC request (described above in relation to communications 572-590), as it requires only a south-to-north translation.

While the described aspects of the instant application depict a REST client with a prior version communicating with an OVSDB server with a current version, the translation proxy described herein may be used in any situation in which an OVSDB client and an OVSDB server are expecting and/or using different OVSDB schema models (e.g., when the version in the request does not match or is a nonmatching version of the current version of the schema model).

Multiple Sources and Method which Facilitates Reading Data from Multiple Sources When performing the translations described herein, the system may need to read data from different columns to those being matched. For example, if a column A has a certain value 'x,' the rule may include translating a value of a column B as '10'; otherwise, the rule may indicate to translate the value of the column B as '20': This may result in additional data either being a part of the JSON RPC request itself (e.g., as stored in JSON RPC transaction 542 of data API 540 in FIG. 5) or as available or stored on the southbound OVSDB server (e.g., as retrieved via the get information 580 communication from DB connector 544 of data API 540 to OVSDB 10.10 server 160 of FIG. 5). Thus, to manage this additional data, the system can include a sideband connection or sideband cache (e.g., connection 180 of FIG. 1A) to the southbound OVSDB server in order to provide or retrieve this data when necessary.

The translation proxy can hide this complexity from translation writers or rule-implementers using a Data Abstraction Object (DAO) pattern. The translation proxy, via the DAO pattern, can expose a data API (e.g., data API 540 of FIG. 5) which can transparently read data from the JSON RPC (542) first, and if the data is not available, retrieve the additional data via the sideband IDL cache (e.g., via DB connector 544). One limitation is that if an attempt is made to translate or change data that resides only in the OVSDB server, and that data is not indicated in the OVSDB protocol request, the attempt will fail because it is not part of the OVSDB protocol request itself.

Figure 6:
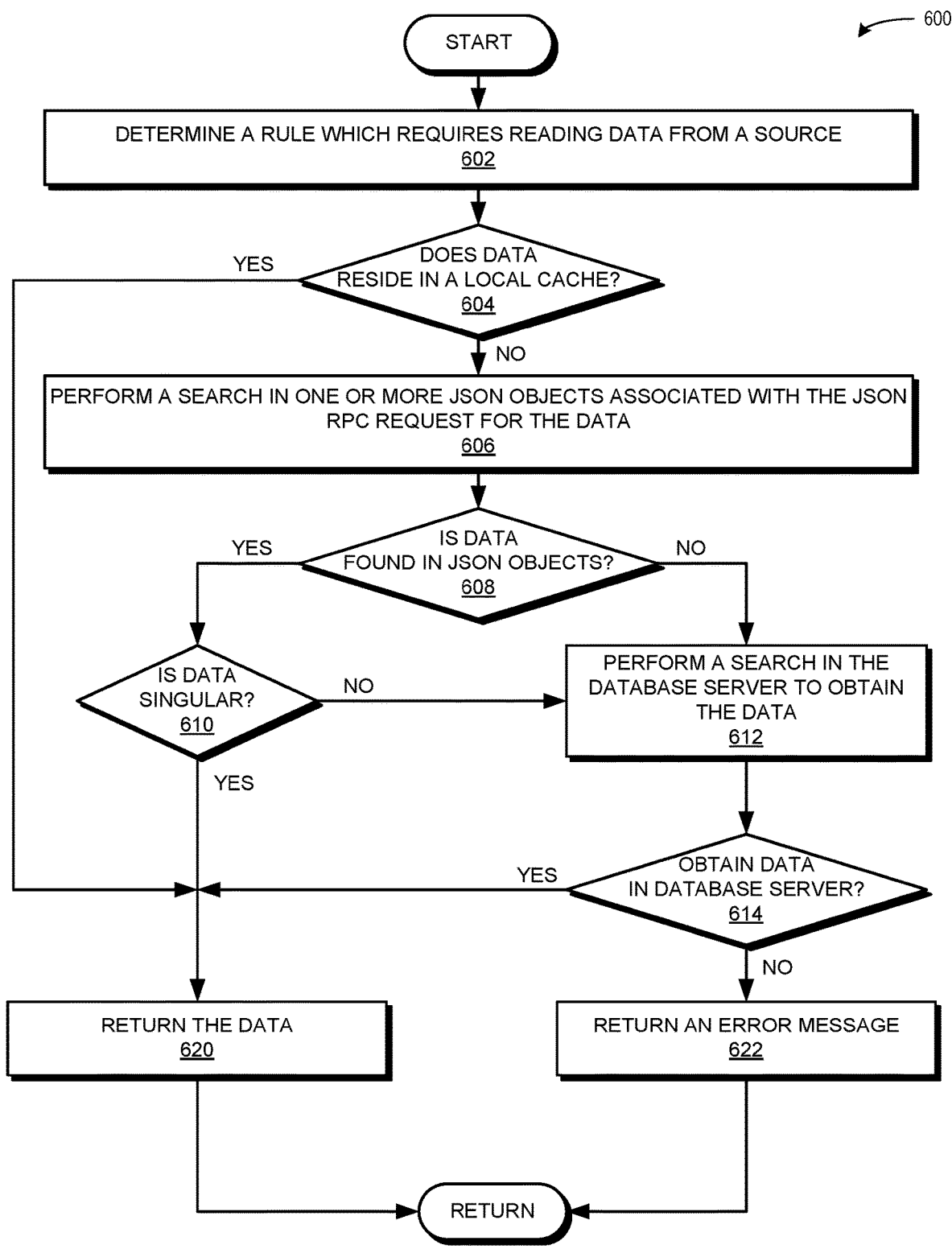
FIG. 6 presents a flowchart illustrating a method which facilitates a data search hierarchy, in accordance with an aspect of the present application.

FIG. 6 presents a flowchart 600 illustrating a method which facilitates a data search hierarchy, in accordance with an aspect of the present application. During operation, the system determines a rule which requires reading data from a source (operation 602). The system determines whether the data resides in a local cache (decision 604). If the data does reside in a local cache (decision 604), the system returns the data (operation 620). If the data does not reside in a local cache (decision 604), the system performs a search in one or more JSON objects associated with the JSON RPC request for the data (operation 606). If the data is found in the JSON objects (decision 608) and is singular data (decision 610), the system returns the data (operation 620). If the data is found in the JSON objects (decision 608) and is not singular data (decision 610), the operation continues at operation 612.

If the data is not found in the JSON objects (decision 608), the system performs a search in the database server to obtain the data (operation 612). If the system successfully obtains the data in the database server (decision 614), the system returns the data (operation 620). If the system unsuccessfully obtains the data in the database server, the system returns an error message (operation 622). The operation returns.

Computer System and Apparatus

Figure 7:
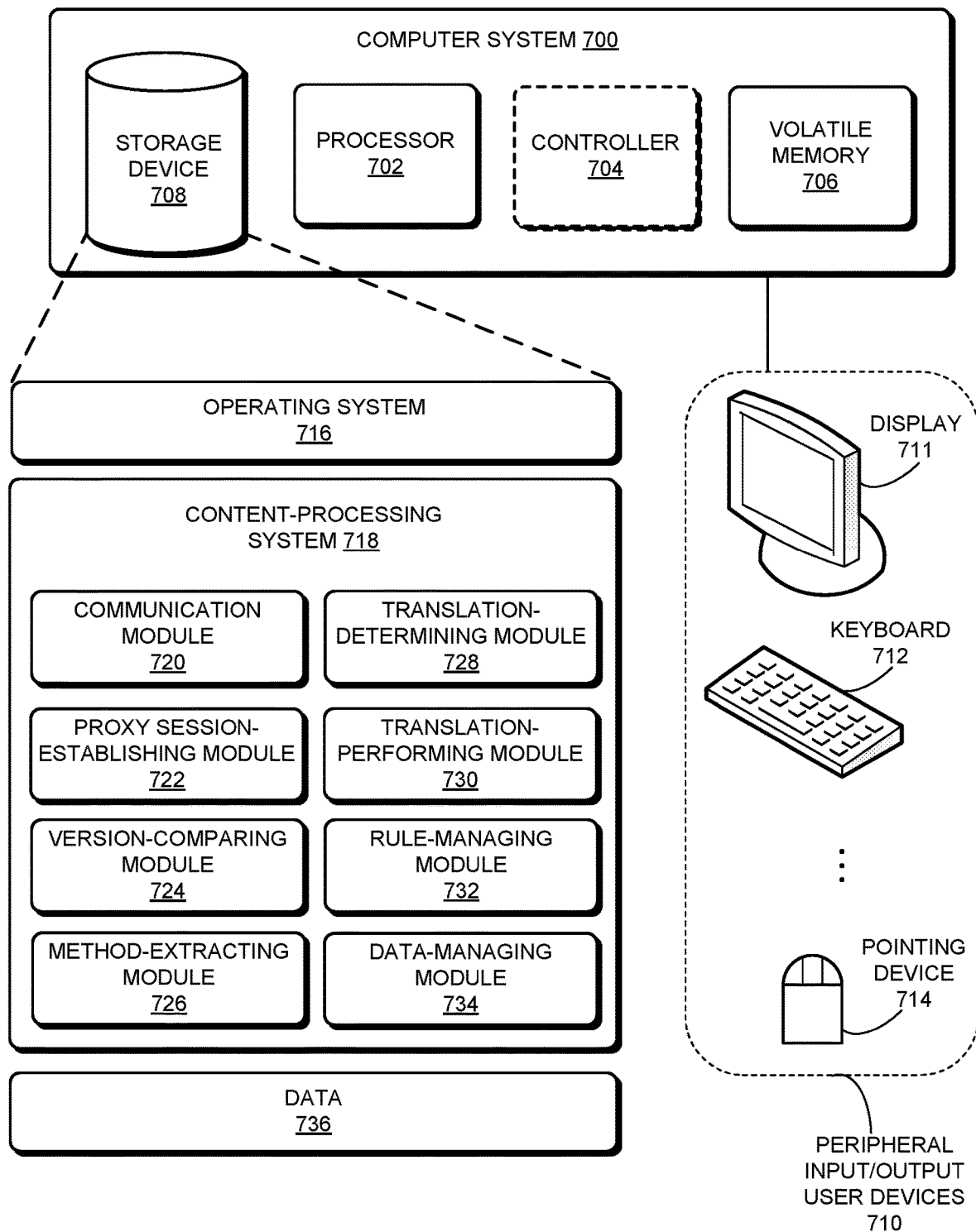
FIG. 7 illustrates a computer system which facilitates on-the-fly OVSDB protocol translation between multiple OVSDB schema versions, in accordance with an aspect of the present application.

FIG. 7 illustrates a computer system which facilitates on-the-fly OVSDB protocol translation between multiple OVSDB schema versions, in accordance with an aspect of the present application. Computer system 700 includes a processor 702, a volatile memory 706, and a storage device 708. In some aspects, computer system 700 can include a controller 704 (indicated by the dashed lines). Volatile memory 706 can include, e.g., random access memory (RAM), that serves as a managed memory, and can be used to store one or more memory pools. Storage device 708 can include persistent storage which can be managed or accessed via processor 702 (or controller 704). Furthermore, computer system 700 can be coupled to peripheral input/output (I/O) user devices 710, e.g., a display device 711, a keyboard 712, and a pointing device 714. Storage device 708 can store an operating system 716, a content-processing system 718, and data 736.

Content-processing system 718 can include instructions, which when executed by computer system 700, can cause computer system 700 or processor 702 to perform methods and/or processes described in this disclosure. Specifically, content-processing system 718 can include instructions for receiving and transmitting data packets, instructions, requests, and responses (communication module 720).

Content-processing system 718 can further include instructions for receiving, from a requesting entity, a request for data stored in a database server which comprises an Open vSwitch Database (OVSDB), wherein the request comprises a JavaScript Object Notation (JSON) remote procedure call (RPC) request (communication module 720). Content-processing system 718 can include instructions for, in response to the request, initiating a proxy session by: creating a first communication session between the requesting entity and a proxy daemon, wherein the request indicates a first version corresponding to the first communication session; and creating a second communication session between the proxy daemon and the database server, wherein the second communication session is associated with a second version corresponding to a model used by the database server (proxy session-establishing module 722). Content-processing system 718 can include instructions for determining that the first version does not match the second version (version-comparing module 724). Content-processing system 718 can also include instructions for extracting, from the request, a method which comprises a JSON RPC method (method-extracting module 726). Content-processing system 718 can include instructions for determining that the method requires translation (translation-determining module 728). Content-processing system 718 can include instructions for performing, based on the first version and the second version, translation of a payload of the request (translation-performing module 730). Content-processing system 718 can include instructions for sending the translated payload to the database server (communication module 720).

Content-processing system 718 can additionally include instructions for obtaining, based on the first version and the second version, a set of rules and associated translations, wherein the translations include metadata filters used as parameters to match the payload of the request (rule-managing module 732). Content-processing system 718 can include instructions for dividing, based on a recursive backtracking algorithm and a set of protocol primitives for the database server, the payload into a plurality of chunks (translation-performing module 730). Content-processing system 718 can also include instructions for, responsive to determining that a respective chunk matches the metadata filters: obtaining a series of paths for each matched metadata filter; and applying, in an order based on a direction of the request or a response, one or more of the rules and associated translations, to translate the payload (translation-performing module 730 and data-managing module 732).

Content-processing system 718 can further include instructions for determining that additional data is required from the database server, obtaining the additional data from the database server, and using the additional data to translate the payload (translation-performing module 730 and data-managing module 734).

Data 736 can include any data that is required as input or generated as output by the methods and/or processes described in this disclosure. Specifically, data 736 can store at least: data; a request; a response; a JSON RPC request or response; a JSON object; a primitive; an OVSDB protocol primitive; a name or data primitive; an indicator of a proxy session; an indicator of a direction of a request or response; a version; an indicator of whether a first version corresponds to a second version; a method; a JSON RPC method; an operation; an operation corresponding to a JSON RPC method; a payload; a translated payload; a reverse translated payload; a rule; a translation; a metadata filter; a parameter; an algorithm; a backtracking algorithm; a chunk; a path; an order; an order based on a direction of a request or response; a filter; a table; a column; a series of paths; JSON paths in dotted notation; a location of a JSON object or a value within a JSON document; a north-to-south direction; a south-to-north direction; an oldest rule; a newest rule; additional data; a name reference; a data reference; a source; and an indicator of whether data is singular.

Figure 8:
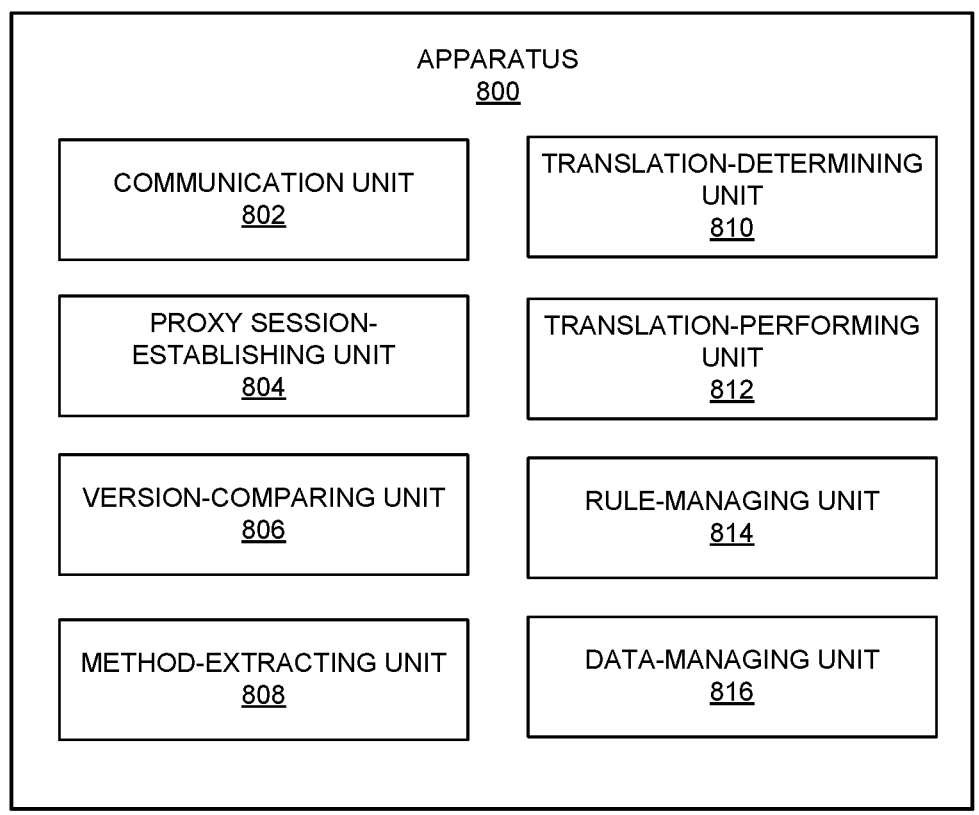
FIG. 8 illustrates an apparatus which facilitates on-the-fly OVSDB protocol translation between multiple OVSDB schema versions, in accordance with an aspect of the present application.

FIG. 8 illustrates an apparatus 800 which facilitates on-the-fly OVSDB protocol translation between multiple OVSDB schema versions, in accordance with an aspect of the present application. Apparatus 800 can comprise a plurality of units or apparatuses which may communicate with one another via a wired, wireless, quantum light, or electrical communication channel. Apparatus 800 may be realized using one or more integrated circuits, and may include fewer or more units or apparatuses than those shown in FIG. 8. Furthermore, apparatus 800 may be integrated in a computer system, or realized as a separate device or devices capable of communicating with other computer systems and/or devices.

Apparatus 800 may also include a non-volatile storage system or a memory management unit. Apparatus 800 can comprise modules or units 802-816 which are configured to perform functions or operations similar to modules 720-734 of computer system 700 of FIG. 7, including: a communication unit 802; a proxy session-establishing unit 804; a version-comparing unit 806; a method-extracting unit 808; a translation-determining unit 810; a translation-performing unit 812; a rule-managing unit 814; and a data-managing unit 816.

In general, the disclosed aspects provide a system which facilitates on-the-fly OVSDB protocol translation between multiple OVSDB schema versions. In one aspect, during operation, the system receives, from a requesting entity, a request for data stored in a database server which comprises an Open vSwitch Database (OVSDB), wherein the request comprises a JavaScript Object Notation (JSON) remote procedure call (RPC) request. In response to the request, the system initiates a proxy session by: creating a first communication session between the requesting entity and a proxy daemon, wherein the request indicates a first version corresponding to the first communication session; and creating a second communication session between the proxy daemon and the database server, wherein the second communication session is associated with a second version corresponding to a model used by the database server. The system determines that the first version does not match the second version, and extracts, from the request, a method which comprises a JSON RPC method. The system determines that the method requires translation, and performs, based on the first version and the second version, translation of a payload of the request. The system sends the translated payload to the database server.

In a variation on this aspect, the system performs the translation of the payload of the request by the following operations. The system obtains, based on the first version and the second version, a set of rules and associated translations, wherein the translations include metadata filters used as parameters to match the payload of the request. The system divides, based on a recursive backtracking algorithm and a set of protocol primitives for the database server, the payload into a plurality of chunks. Responsive to determining that a respective chunk matches the metadata filters, the system obtains a series of paths for each matched metadata filter, and applies, in an order based on a direction of the request or a response, one or more of the rules and associated translations, to translate the payload.

In a further variation, responsive to sending the translated payload to the database server, the system receives, by the proxy daemon from the database server, a response. The system performs, by the proxy daemon based on the one or more rules and associated translations, a reverse translation on the response to obtain reverse translated results in a format associated with the request. The system returns the reverse translated results in response to the request.

In a further variation, the metadata filters comprise at least one of: a first filter for a table only, wherein the first filter matches to any JSON containing operations on the table; and a second filter for a table and one or more columns, wherein the second filter matches a JSON containing operations on the table and at least one column.

In a further variation, the obtained series of paths are JSON paths represented in dotted notation, and a respective path identifies a location of a JSON object or value within a JSON document and further identifies a JSON object which is to be modified or deleted upon applying the rules and associated translations.

In a further variation, the direction of the request from the requesting entity to the database server comprises a north-to-south direction, and the direction of the response from the database server to the requesting entity comprises a south-to-north direction. The rules are applied from oldest to newest in the north-to-south direction and from newest to oldest in the south-to-north direction.

In a further variation, applying the one or more rules and associated translations involves: determining that additional data is required from the database server; obtaining the additional data from the database server; and using the additional data to translate the payload.

In a further variation, the protocol primitives comprise OVSDB protocol primitives, which comprise at least one of: a name reference, which indicates a JSON object containing an OVSDB column name; and a data reference, which indicates a JSON object containing an OVSDB column value.

In a further variation, the system extracts the method from the request by, responsive to determining that the method is a "transact" JSON RPC method, extracting corresponding operations of the method.

In a further variation, the requesting entity is at least one of: an external client; a client using a REST API or other API, wherein the request indicates an API version which comprises the first version; and a database server which uses a schema with a third version which is different from the second version. That is, the third version can be older or newer (e.g., as in described above in relation to the in-service software upgrade of FIG. 1B) than the second version.

In a further variation, the system determines a rule which requires reading data from a source. The system determines that the data does not reside in a local cache. The system performs a search in one or more JSON objects associated with the JSON RPC request for the data. Responsive to finding the data based on the search and determining that the data is singular, the system returns the data. Responsive to finding the data based on the search and determining that the data is not singular: the system performs a search in the database server to obtain the data; responsive to successfully obtaining the data in the database server, the system returns the data; and responsive to unsuccessfully obtaining the data in the database server, the system returns an error message.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware devices or apparatus. For example, the hardware devices or apparatus can include, but are not limited to, application-specific integrated circuit (ASIC) chips, field-programmable gate arrays (FPGAs), dedicated or shared processors that execute a particular software program or a piece of code at a particular time, and other programmable-logic devices now known or later developed. When the hardware devices or apparatus are activated, the hardware modules perform the methods and processes included within them.

The foregoing descriptions of aspects have been presented for purposes of illustration and description only. They are not intended to be exhaustive or to limit the aspects described herein to the forms disclosed. Accordingly, many modifications and variations will be apparent to practitioners skilled in the art. Additionally, the above disclosure is not intended to limit the aspects described herein. The scope of the aspects described herein is defined by the appended claims.

What is claimed is:

1. A computer-implemented method, comprising:
receiving, from a requesting entity, a request for data stored in a database server which comprises an Open vSwitch Database (OVSDB), wherein the request comprises a JavaScript Object Notation (JSON) remote procedure call (RPC) request;
in response to the request, initiating a proxy session by:
creating a first communication session between the requesting entity and a proxy daemon, wherein the request indicates a first version corresponding to the first communication session; and
creating a second communication session between the proxy daemon and the database server, wherein the second communication session is associated with a second version corresponding to a model used by the database server; and
responsive to determining that the first version does not match the second version;
extracting, from the request, a first method which comprises a JSON RPC method;
responsive to determining that the first method requires translation, performing, based on the first version and the second version, translation of a payload of the request, by:
obtaining, based on the first version and the second version, a set of rules and associated translations, wherein the translations include metadata filters used as parameters to match the payload of the request;
dividing, based on a recursive backtracking algorithm and a set of protocol primitives for the database server, the payload into a plurality of chunks; and
responsive to determining that a respective chunk matches the metadata filters: obtaining a series of paths for each matched metadata filter and applying, in an order based on a direction of the request or a response, one or more of the rules and associated translations, to translate the payload; and
sending the translated payload to the database server.

2. The method of claim 1, further comprising:
responsive to sending the translated payload to the database server, receiving, by the proxy daemon from the database server, a first response;
performing, by the proxy daemon based on the one or more rules and associated translations, a reverse translation on the first response to obtain reverse translated results in a format associated with the request; and
returning the reverse translated results in response to the request.

3. The method of claim 1, wherein the metadata filters comprise at least one of:
a first filter for a table only, wherein the first filter matches to any JSON containing operations on the table; and
a second filter for a table and one or more columns, wherein the second filter matches a JSON containing operations on the table and at least one column.

4. The method of claim 1,
wherein the obtained series of paths are JSON paths represented in dotted notation, and
wherein a respective path identifies a location of a JSON object or value within a JSON document and further identifies a JSON object which is to be modified or deleted upon applying the rules and associated translations.

5. The method of claim 1,
wherein the direction of the request from the requesting entity to the database server comprises a north-to-south direction,
wherein the direction of the response from the database server to the requesting entity comprises a south-to-north direction, and wherein the rules are applied from oldest to newest in the north-to-south direction and from newest to oldest in the south-to-north direction.

6. The method of claim 1, wherein applying the one or more rules and associated translations involves:
   determining that additional data is required from the database server;
   obtaining the additional data from the database server; and
   using the additional data to translate the payload.

7. The method of claim 1, wherein the protocol primitives comprise OVSDB protocol primitives, which comprise at least one of:
   a name reference, which indicates a JSON object containing an OVSDB column name; and
   a data reference, which indicates a JSON object containing an OVSDB column value.

8. The method of claim 1, wherein extracting the first method from the request comprises:
   responsive to determining that the first method is a "transact" JSON RPC method, extracting corresponding operations of the first method.

9. The method of claim 1, wherein the requesting entity is at least one of:
   an external client;
   a client using a REST API, wherein the request indicates an API version which comprises the first version; and
   a database server which uses a schema with a third version which is different from the second version.

10. The method of claim 1, further comprising:
    determining a rule which requires reading data from a source;
    determining that the data does not reside in a local cache;
    perform a search in one or more JSON objects associated with the JSON RPC request for the data;
    responsive to finding the data based on the search and determining that the data is singular, returning the data; and
    responsive to finding the data based on the search and determining that the data is not singular:
      performing a search in the database server to obtain the data;
      responsive to successfully obtaining the data in the database server, returning the data; and
      responsive to unsuccessfully obtaining the data in the database server, returning an error message.

11. A computer system, comprising:
    a processor; and
    a memory coupled to the processor and storing instructions which, when executed by the processor, cause the processor to perform a method, the method comprising:
      receiving, from a requesting entity, a request for data stored in a database server which comprises an Open vSwitch Database (OVSDB), wherein the request comprises a JavaScript Object Notation (JSON) remote procedure call (RPC) request;
      creating a first communication session between the requesting entity and a proxy daemon, wherein the request indicates a first version corresponding to the first communication session; and
      creating a second communication session between the proxy daemon and the database server, wherein the second communication session is associated with a second version corresponding to a model used by the database server; and
      responsive to determining that the first version does not match the second version:
        extracting, from the request, a first method which comprises a JSON RPC method;
        responsive to determining that the first method requires translation, performing, based on the first version and the second version, translation of a payload of the request, by:
          obtaining, based on the first version and the second version, a set of rules and associated translations, wherein the translations include metadata filters used as parameters to match the payload of the request;
          dividing, based on a recursive backtracking algorithm and a set of protocol primitives for the database server, the payload into a plurality of chunks; and
          responsive to determining that a respective chunk matches the metadata filters: obtaining a series of paths for each matched metadata filter; and
          applying, in an order based on a direction of the request or a response, one or more of the rules and associated translations, to translate the payload; and
        sending the translated payload to the database server.

12. The computer system of claim 11, wherein the method further comprises:
    responsive to sending the translated payload to the database server, receiving, by the proxy daemon from the database server, a first response;
    performing, by the proxy daemon based on the one or more rules and associated translations, a reverse translation on the first response to obtain reverse translated results in a format associated with the request; and
    returning the reverse translated results in response to the request.

13. The computer system of claim 11,
    wherein the obtained series of paths are JSON paths represented in dotted notation, and
    wherein a respective path identifies a location of a JSON object or value within a JSON document and further identifies a JSON object which is to be modified or deleted upon applying the rules and associated translations.

14. The computer system of claim 11,
    wherein the direction of the request from the requesting entity to the database server comprises a north-to-south direction,
    wherein the direction of the response from the database server to the requesting entity comprises a south-to-north direction, and
    wherein the rules are applied from oldest to newest in the north-to-south direction and from newest to oldest in the south-to-north direction.

15. The computer system of claim 11, wherein applying the one or more rules and associated translations involves:
    determining that additional data is required from the database server;
    obtaining the additional data from the database server; and
    using the additional data to translate the payload.

16. The computer system of claim 11, wherein the requesting entity is at least one of:
    an external client;
    a client using a REST API, wherein the request indicates an API version which comprises the first version; and a database server which uses a schema with a third version which is different from the second version.

17. The computer system of claim 11,
wherein the metadata filters comprise at least one of:
- a first filter for a table only, wherein the first filter matches to any JSON containing operations on the table; and
- a second filter for a table and one or more columns, wherein the second filter matches a JSON containing operations on the table and at least one column, and wherein the protocol primitives comprise OVSDB protocol primitives, which comprise at least one of:
- a name reference, which indicates a JSON object containing an OVSDB column name; and
- a data reference, which indicates a JSON object containing an OVSDB column value.

18. A non-transitory computer-readable storage medium storing instructions that when executed by a computer cause the computer to perform a method, the method comprising:
receiving, from a requesting entity, a request for data stored in a database server which comprises an Open vSwitch Database (OVSDB), wherein the request comprises a JavaScript Object Notation (JSON) remote procedure call (RPC) request;
in response to the request, initiating a proxy session by:
creating a first communication session between the requesting entity and a proxy daemon, wherein the request indicates a first version corresponding to the first communication session; and
creating a second communication session between the proxy daemon and the database server, wherein the second communication session is associated with a second version corresponding to a model used by the database server; and
responsive to determining that the first version does not match the second version;
extracting, from the request, a first method which comprises a JSON RPC method;
responsive to determining that the first method requires translation, performing, based on the first version and the second version, translation of a payload of the request, by:
obtaining, based on the first version and the second version, a set of rules and associated translations, wherein the translations include metadata filters used as parameters to match the payload of the request;
dividing, based on a recursive backtracking algorithm and a set of protocol primitives for the database server, the payload into a plurality of chunks; and
responsive to determining that a respective chunk matches the metadata filters: obtaining a series of paths for each matched metadata filter; and applying, in an order based on a direction of the request or a response, one or more of the rules and associated translations, to translate the payload; and
sending the translated payload to the database server.

19. The non-transitory computer-readable storage medium of claim 18, wherein the method further comprises:
responsive to sending the translated payload to the database server, receiving, by the proxy daemon from the database server, a first response;
performing, by the proxy daemon based on the one or more rules and associated translations, a reverse translation on the first response to obtain reverse translated results in a format associated with the request; and
returning the reverse translated results in response to the request.

20. The non-transitory computer-readable storage medium of claim 18, wherein applying the one or more rules and associated translations involves:
determining that additional data is required from the database server;
obtaining the additional data from the database server; and
using the additional data to translate the payload.

* * * * *